US009548146B2

(12) United States Patent
Chassaigne et al.

(10) Patent No.: US 9,548,146 B2
(45) Date of Patent: Jan. 17, 2017

(54) COVER SHEATH, FASTENING ARRANGEMENT AND METHOD OF FASTENING A CONDUCTING CABLE TO A CARRIER COMPONENT

(71) Applicant: AIRBUS OPERATIONS GMBH, Hamburg (DE)

(72) Inventors: Didier Chassaigne, Hamburg (DE); Lueder Kosiankowski, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 369 days.

(21) Appl. No.: 13/929,407

(22) Filed: Jun. 27, 2013

(65) Prior Publication Data
US 2014/0008103 A1 Jan. 9, 2014

Related U.S. Application Data

(60) Provisional application No. 61/667,446, filed on Jul. 3, 2012.

(30) Foreign Application Priority Data

Jul. 3, 2012 (EP) .................................... 12174766

(51) Int. Cl.
| H01B 17/02 | (2006.01) |
| H02G 3/04 | (2006.01) |
| H02G 3/30 | (2006.01) |
| H02G 3/34 | (2006.01) |

(52) U.S. Cl.
CPC ............ *H01B 17/02* (2013.01); *H02G 3/0487* (2013.01); *H02G 3/305* (2013.01); *H02G 3/34* (2013.01)

(58) Field of Classification Search
USPC ............................................. 174/158 R, 36
IPC ........................ H01B 17/02; H02G 3/34,3/305
See application file for complete search history.

(56) References Cited

U.S. PATENT DOCUMENTS

| 4,791,236 | A | * | 12/1988 | Klein | ........................ | D04B 1/14 |
| | | | | | | 138/166 |
| 4,854,015 | A | * | 8/1989 | Shaull | .................... | A44B 18/00 |
| | | | | | | 24/16 R |
| 4,920,235 | A | * | 4/1990 | Yamaguchi | ........ | H01B 11/1033 |
| | | | | | | 138/167 |
| 5,209,964 | A | * | 5/1993 | Nakagawa | ............... | H01B 5/12 |
| | | | | | | 428/193 |
| 5,391,838 | A | * | 2/1995 | Plummer, III | ..... | H01B 11/1008 |
| | | | | | | 174/105 R |
| 6,822,166 | B2 | * | 11/2004 | James | ................... | H02G 3/0487 |
| | | | | | | 174/93 |
| 7,312,399 | B2 | * | 12/2007 | Girot | ..................... | F16L 3/1025 |
| | | | | | | 174/135 |

(Continued)

FOREIGN PATENT DOCUMENTS

| DE | 203 10 581 | 10/2003 |
| DE | 10 2004 001 078 | 7/2005 |

(Continued)

*Primary Examiner* — William H Mayo, III
*Assistant Examiner* — Krystal Robinson
(74) *Attorney, Agent, or Firm* — Dickinson Wright PLLC

(57) ABSTRACT

A cover sheath includes a main body being adapted to define a channel for accommodating at least one conducting cable extending there through, and a hook and loop arrangement disposed on at least a portion of an outer surface of the main body. The main body is made of an electrically conducting material.

15 Claims, 1 Drawing Sheet

(56) References Cited

U.S. PATENT DOCUMENTS

| | | | | |
|---|---|---|---|---|
| 7,668,426 | B2* | 2/2010 | Livingston | G02B 6/4465 385/102 |
| 8,276,243 | B2* | 10/2012 | Caveney | A44B 18/008 24/16 R |
| 2002/0170727 | A1* | 11/2002 | Holland | H02G 15/18 174/19 |
| 2003/0024850 | A1* | 2/2003 | Synder | F16L 59/029 206/702 |
| 2003/0221858 | A1* | 12/2003 | James | H02G 3/0487 174/93 |
| 2004/0016565 | A1* | 1/2004 | Gallant | B29C 43/222 174/117 F |
| 2004/0081411 | A1* | 4/2004 | Gladfelter | F16L 3/26 385/100 |
| 2005/0098345 | A1* | 5/2005 | Niehaus | H02G 3/0487 174/135 |
| 2009/0242066 | A1* | 10/2009 | McKane | H02G 3/0475 138/121 |
| 2010/0007056 | A1 | 1/2010 | Jacob | |

FOREIGN PATENT DOCUMENTS

| | | | |
|---|---|---|---|
| DE | 10 2007 062 111 | 7/2009 | |
| DE | 10 2008 032 834 | 1/2010 | |
| EP | 0 813 277 | 12/1997 | |
| WO | 03/021736 | 3/2003 | |
| WO | WO03021736 A1 * | 3/2003 | H02G 3/04 |

\* cited by examiner

ID U.S. 9,548,146 B2

COVER SHEATH, FASTENING ARRANGEMENT AND METHOD OF FASTENING A CONDUCTING CABLE TO A CARRIER COMPONENT

CROSS REFERENCE TO RELATED APPLICATIONS

This application is entitled to and claims the benefit of European Application No. EP 12 174 766.1 filed Jul. 3, 2012, and U.S. Provisional Application No. 61/667,446, filed Jul. 3, 2012, the disclosures of each of which, including the specification, claims, drawings and abstract, are incorporated herein by reference in their entirety.

FIELD

The invention relates to a cover sheath for accommodating at least one conducting cable. Furthermore, the invention relates to a fastening arrangement for fastening at least one conducting cable to a carrier component such as, for example, a structural component of a vehicle, in particular an aircraft. Finally, the invention relates to a method of fastening at least one conducting cable to a carrier component such as, for example, a structural component of a vehicle, in particular an aircraft.

BACKGROUND

In aircraft construction, efforts are being made to use as load-bearing components increasingly components which are composed wholly or partly of fibre-reinforced composite materials, for example carbon fibre-reinforced plastics (CFRP). For example, DE 10 2007 062 111 A1 describes a transverse support structure which is composed of carbon fibre-reinforced plastic and serves to support the individual panels of an aircraft floor system for separating a passenger cabin from a cargo compartment arranged below the passenger cabin. Furthermore, it is known, for example from DE 10 2004 001 078 A1, to provide aircraft fuselage segments with a skin which is designed with a sandwich construction and made of fibre-reinforced composite materials. Finally, DE 10 2008 032 834 A1 and US 2010/0007056 A1 relate to a stiffening component composed of a fibre-reinforced composite material and configured in the form of an omega stringer.

Aircraft structural components which are composed wholly or partly of fibre-reinforced composite materials are not suitable for use as electrical return conductors. Further, these structural components do not provide for a shielding of conducting cables against electromagnetic radiation or lightning. In an aircraft comprising structural components made of fibre-reinforced composite materials conducting cables therefore usually are received in suitable protective shielding tubes. Moreover, additional return conductor cables are provided which may, for example, be twisted with the conducting cables and, together with the conducting cables, be received in the protective shielding tubes. The conducting cables and the return conductor cables are fastened to the aircraft structural components using screws, spacers, clamps and the like.

As an alternative, DE 10 2007 062 111 A1 proposes to design an aircraft structural component so as to comprise a hollow space forming an installation space for conducting cables. Inner surfaces of the installation space are covered by a layer of an electrically conductive material such as a metal or an electrically conductive plastic material so as to ensure a shielding of conducting cables installed in the installation space against electromagnetic radiation or lightning.

SUMMARY

The invention is directed at the object of providing a cover sheath for accommodating at least one conducting cable and a fastening arrangement which allow the conducting cable to be fastened to a carrier component such as, for example, a structural component of a vehicle, in particular an aircraft in a particularly easy and time saving manner and which further provides for a shielding of the at least conducting cable against electromagnetic radiation or lightning. Furthermore, the invention is directed at the object of providing a method which allows the fasting of at least one conducting cable to a carrier component such as, for example, a structural component of a vehicle, in particular an aircraft in a particularly easy and time saving manner and which further provides for a shielding of the at least conducting cable against electromagnetic radiation or lightning.

These objects are achieved by a cover sheath having the features of claim 1, a fastening arrangement having features of attached claims and a method having features of attached claims.

A cover sheath according to the invention comprises a main body being adapted to define a channel for accommodating at least one conducting cable extending therethrough. In the context of the present application the term "conducting cable" designates any kind of electric cable or signal cable which may be used for transmitting electric current, signals and the like. Preferably, the main body of the cover sheath is shaped and dimensioned such that the channel defined by the main body is suitable for accommodating a plurality of conducting cables which may be arranged in the form of a cable bundle. The main body of the cover sheath, for example, may have a hollow cylindrical shape.

The cover sheath according to the invention further comprises a hook and loop arrangement which is disposed on at least a portion of an outer surface of the main body. If desired or necessary, the hook and loop arrangement, however, may also cover the entire outer surface of the main body. By means of the hook and loop arrangement, the cover sheath, together with the at least one conducting cable extending through the channel defined by the main body of the cover sheath, may be fastened to a carrier component such as, for example, a structural component of a vehicle, in particular an aircraft in a particularly easy and time saving manner by simply engaging the hook and loop arrangement disposed on at least a portion of the outer surface of the main body with a complementary further hook and loop arrangement fastened to the carrier component.

As a result, additional fastening means for fastening the cover sheath to the carrier component such as screws, spacers, clamps and the like can be dispensed with resulting in a significant weight reduction which is in particular advantageous when the cover sheath according to the invention is used for installing at least one conducting cable in an aircraft. Moreover, the cover sheath, together with the at least one conducting cable extending through the channel defined by the main body of the cover sheath, can easily be detached from the carrier component by simply disengaging the hook and loop arrangement disposed on at least a portion of the outer surface of the main body of the cover sheath from the further hook and loop arrangement fastened to the carrier component. Maintenance and replacement of the at least one conducting cable thus is significantly simplified.

The main body of the cover sheath according to the invention is made of an electrically conducting material. Preferably, the main body is made of a metallic material such as, for example, aluminum or an aluminum alloy. A main body made of an electrical conducting material shields a conducting cable extending through the channel defined by the main body against electromagnetic radiation or lightning. Simultaneously, the main body may act as an electrical return conductor. The cover sheath according to the invention thus allows to dispense with additional return conductor cables and hence further simplifies the installation of the at least one conducting cable as well as the realization of a further weight reduction.

In a preferred embodiment of the cover sheath the main body is provided with a slit extending along at least a portion of a channel defined by the main body in a direction of a longitudinal axis of the channel. The slit provided in the main body of the cover sheath allows a conducting cable to be arranged in the channel defined by the main body in a particularly easy and time saving manner. The main body of the cover sheath may be designed so as to have some resilience such that the slit can be forced open so as to arrange the conducting cable in the channel defined in the main body, and such that the slit is urged to close again at least to a certain extent after releasing the opening force due to the resilience of the main body.

The cover sheath according to the invention may further comprise a slit closing device for closing the slit after arranging the at least one conducting cable in the channel defined by the main body. The slit closing device may comprise or consist of a zip fastener, a cable strap and/or a hook and loop arrangement. The slit closing device ensures that a conducting cable is securely received in the channel defined by the main body.

The hook and loop arrangement disposed on at least a portion of the outer surface of the main body may be made of an electrically insulating material. A hook and loop arrangement made of an electrically insulating material is particularly suitable when the main body of the cover sheath and a conducting cable extending through the channel defined by the main body should be insulated from a carrier component carrying the cover sheath.

As an alternative, it is, however, also conceivably to provide the cover sheath according to the invention with a hook and loop arrangement which is made of an electrically conducting material. For example, the hook and loop arrangement may be made of a metallic material such as aluminum or an aluminum alloy. A hook and loop arrangement made of an electrically conducting material enhances the shielding effect of the electrically conductive main body.

The main body of the cover sheath preferably is made of a finely woven web or mesh. A main body made of a finely woven metallic web or mesh provides for the desired electrical conducting properties of the main body and simultaneously is easy to handle and as lightweight as possible.

Preferably, the hook and loop arrangement is disposed on at least a portion of an outer surface of the main body which extends along at least a portion of the channel defined by the main body in a direction of a longitudinal axis of the channel. For example, the hook and loop arrangement may have the form of a hook and loop tape extending along a longitudinal axis of the channel, preferably along the entire length of the channel defined by the main body. A hook and loop arrangement of this kind allows the cover sheath to be securely fastened to a carrier component.

The hook and loop arrangement of the cover sheath according to the invention may comprise a substrate, wherein a first lower surface of the substrate is fastened to the outer surface of the main body. Hooks and/or loops of the hook and loop arrangement preferably extend from a second upper surface of the substrate. The hook and loop arrangement may be attached to the main body of the cover sheath by gluing or any other suitable fastening or joining method.

As an alternative, it is, however, also conceivable that hooks and/or loops of the hook and loop arrangement are formed integral with the main body, i.e., that hooks and/or loops of the hook and loop arrangement directly extend from the outer surface of the main body. Further, a portion of the hook and loop arrangement may comprise a substrate and another portion of the hook and loop arrangement may comprises hooks and/or loops which are formed integral with the main body.

A fastening arrangement according to the invention comprises a cover sheath as described above and a further hook and loop arrangement. The further hook and loop arrangement is adapted to be fastened to a carrier component, for example a structural component of a vehicle, in particular an aircraft. Moreover, the further hook and loop arrangement is adapted to interact with the hook and loop arrangement of the cover sheath so as to fasten the cover sheath to the carrier component.

Preferably the hook and loop arrangement disposed on at least a portion of the outer surface of the main body of the cover sheath and the further hook and loop arrangement adapted to be fastened to the carrier component are made of the same material. Specifically, in case the hook and loop arrangement of the cover sheath is made of an electrically insulating material, preferably also the further hook and loop arrangement is made of an electrically insulating material so as to enhance the insulating properties of the hook and loop arrangement. In contrast, in case the hook and loop arrangement of the cover sheath is made of an electrically conducting material, preferably also the further hook and loop arrangement adapted to be fastened to the carrier component also is made of an electrically conducting material so as to enhance the electrical conducting properties of the hook and loop arrangement.

As already mentioned above, the hook and loop arrangement of the cover sheath may cover the entire outer surface of the main body or only a portion of the outer surface of the main body. In particular in a fastening arrangement wherein the hook and loop arrangement of the cover sheath covers only a portion of the outer surface of the main body, the hook and loop arrangement of the cover sheath and the further hook and loop arrangement adapted to be fastened to the carrier component may be shaped and dimensioned so as to be at least substantially congruent. Such a design of the hook and loop arrangement and the further hook and loop arrangement provides for a secure interaction of the hook and loop arrangement and the further hook and loop arrangement and hence a secure fastening of the cover sheath to the carrier component.

In a method according to the invention of fastening at least one conducting cable to a carrier component, the at least one conducting cable is arranged in the channel defined by the main body of a cover sheath as described above. Thereafter, the cover sheath, together with the at least one conducting cable extending through the channel defined by the main body of the cover sheath, is fastened to the carrier component by engaging the hook and loop arrangement of the cover sheath with a further hook and loop arrangement fastened to the carrier component.

Preferably, the slit provided in the main body of the cover sheath is closed after arranging the at least one conducting cable in the channel defined by the main body and prior to fastening the cover sheath, together with the at least one conducting cable extending through the channel defined by the main body of the cover sheath, to the carrier component.

A cover sheath as described above, a fastening arrangement as described above and/or a method of fastening at least one conducting cable to a carrier component as described above is/are particularly suitable for use in an aircraft.

BRIEF DESCRIPTION OF DRAWINGS

A preferred embodiment of the invention in the following is described in more detail with reference to the appended schematic drawings, wherein.

DETAILED DESCRIPTION

Figure 1:
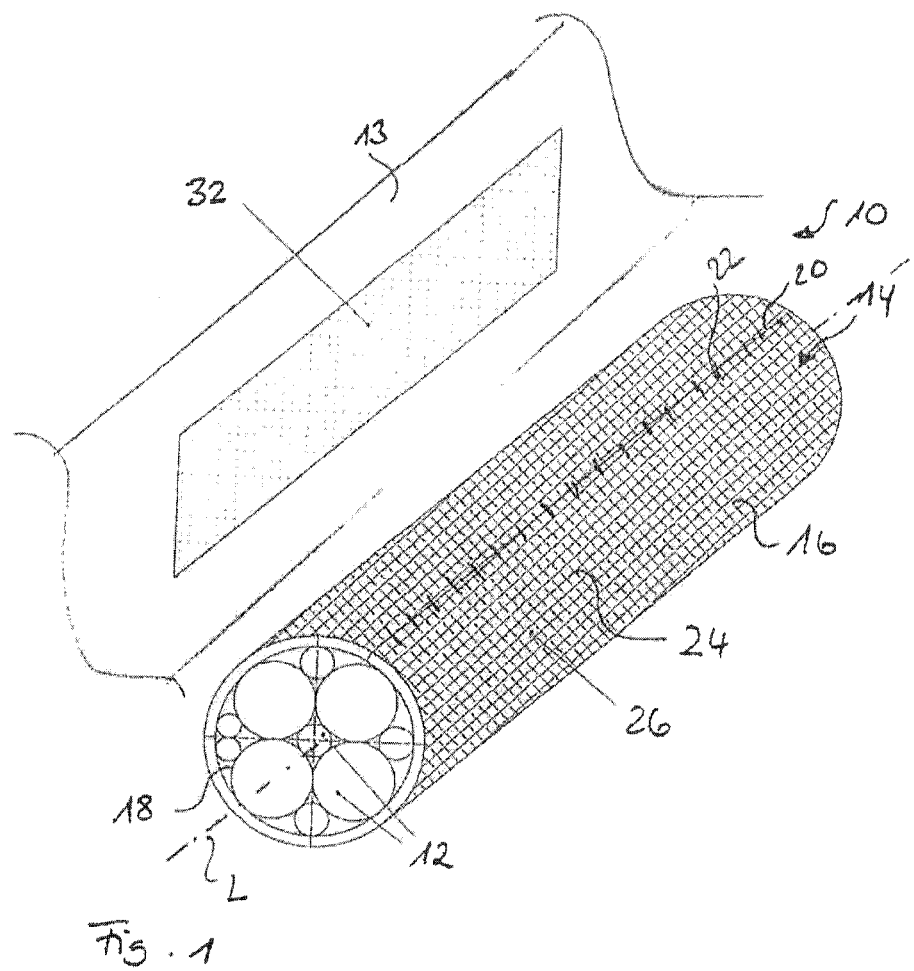
FIG. 1 shows a fastening arrangement for fastening a bundle of conducting cables to a carrier component.

FIG. 1 shows a fastening arrangement 10 which in a vehicle, in particular an aircraft may be used for fastening a bundle of conducting cables 12 to a carrier component 13. The carrier component 13 may, for example, be a structural component of the aircraft which is made of a fibre-reinforced composite material, for example carbon fibre-reinforced plastic. The fastening arrangement 10 comprises a cover sheath 14 having a main body 16. In the exemplary embodiment of a fastening arrangement 10 shown in FIG. 1, the main body 16 of the cover sheath 14 has a substantially hollow-cylindrical shape and defines a channel 18 for accommodating the bundle of conducting cables 12, the channel 18 having a substantially circular cross section.

The main body 16 of the cover sheath 14 is made of an electrically conducting material, in particular a metal. Specifically, the main body 16 is formed by a finely woven metallic web or mesh. As a result, the cover sheath 14 provides for a shielding of the bundle of conducting cables 12 extending through the channel 18 of the main body 16 against electromagnetic radiation or lightning. Further, the main body 16 of the cover sheath 14 acts as an electrical return conductor such that the bundle of conducting cables 12 does not need to comprise an additional return conductor cable.

The main body 16 of the cover sheath 14 is provided with a slit 20 extending along the entire length of the channel 18 defined by the main body 16 in a direction of a longitudinal axis L of the channel 18. The slit 20 may be opened so as to allow the bundle of conducting cables 12 to be arranged in the channel 18 defined by the main body 16 in a particularly easy and time saving manner. When the bundle of conducting cables 12 is accommodated in the channel 18, the slit 20 may be closed by a slit closing device 22 which, in the exemplary embodiment of a fastening arrangement 10 according to FIG. 1, is designed in the form of a zip fastener. As an alternative, it is, however, also conceivable to use a cable strap or a hook and loop arrangement as the slit closing device 22.

Figure 2:
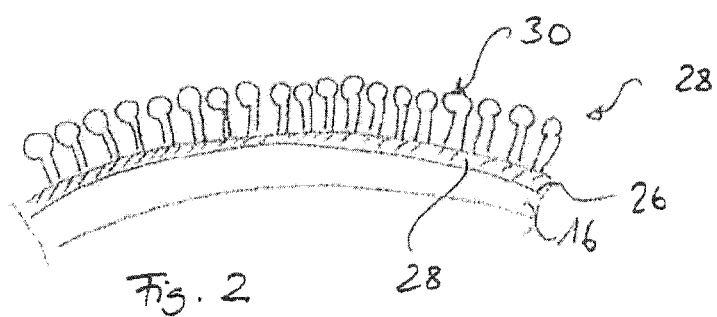
FIG. 2 shows a detailed view of an outer surface of a main body of a cover sheath of the fastening arrangement according to FIG. 1.

The cover sheath 14 further comprises a hook and loop arrangement 24 which, in the exemplary embodiment of a fastening arrangement 10 according to FIG. 1, covers an entire outer surface 26 of the main body 16. As becomes apparent from FIG. 2, the hook and loop arrangement 24 comprises a substrate 28. A first lower surface of the substrate 28 is fastened to the outer surface 26 of the main body 16, whereas hooks and loops 30 of the hook and loop arrangement 24 extend from a second upper surface of the substrate 28. Although not shown in the drawings, it is, however, also conceivable that the hooks and loops 30 of the hook and loop arrangement 24 are formed integral with the main body 16 of the cover sheath, i.e. extend directly from the outer surface 26 of the main body 16.

In the exemplary embodiment of a fastening arrangement according to FIG. 1, the hook and loop arrangement 24 is made of an electrically conducting material, in particular a metal. The hook and loop arrangement 24 then enhances the electrical conducting properties and thus the shielding properties of the cover sheath 14. It is, however, also conceivable to provide the cover sheath 14 with a hook and loop arrangement 24 made of an electrically insulating material, in particular, in case the main body 16 of the cover sheath 14 should be electrically insulated from the carrier component 13.

The fastening arrangement 10 also comprises a further hook and loop arrangement 32. The further hook and loop arrangement 32 is fastened to the carrier component 13 and adapted to interact with the hook and loop arrangement 24 of the cover sheath 14 so as to fasten the cover sheath 14 to the carrier component 13. The further hook and loop arrangement 32 is made of the same material as the hook and loop arrangement 24 of the cover sheath.

Since in the exemplary embodiment of a fastening arrangement 10 according to FIG. 1 the entire outer surface 26 of the main body 16 is covered with the hook and loop arrangement 24, an alignment of the hook and loop arrangement 24 of the covers sheath 14 with the further hook and loop arrangement 32 and the fastening the cover sheath 14 to the carrier component is particularly easy. It is, however, also conceivable that the hook and loop arrangement 24 covers only a portion of the outer surface 26 of the main body 16. In this case, the hook and loop arrangement 24 of the cover sheath 14 and the further hook and loop arrangement 32 may be shaped and dimensioned so as to be at least substantially congruent. Such a design of the hook and loop arrangement 24 and the further hook and loop arrangement 32 ensures a satisfactory interaction between the hook and loop arrangement 24 and the further hook and loop arrangement 32. In case the hook and loop arrangement 24 is disposed on only a portion of the outer surface 26 of the main body 16, the hook and loop arrangement 24 may extend along at least a substantial portion of the channel 18 defined by the main body 16 in a direction of the longitudinal axis L of the channel 18, so as to provide for a secure fastening of the cover sheath 14 to the carrier component 13 along the entire length of the cover sheath 14.

For fastening the bundle of conducting cables 12 to the carrier component 13, the slit 20 of the main body 16 is opened by opening the slit closing device 22 and the bundle of conducting cables 12 is arranged in the cannel 18 defined by the main body 16 of the cover sheath 14. When the conducting cables 12 are arranged in the desired position in the channel 18, the slit 20 is closed by means of the slit closing device 22. Thereafter, the cover sheath 14, together with the bundle of conducting cables 12 extending through the channel 18 defined by the main body 16 of the cover sheath 14, is fastened to the carrier component 13 by engaging the hook and loop arrangement 24 of the cover sheath 14 with the further hook and loop arrangement 32 fastened to the carrier component 13.

The invention claimed is:

1. A cover sheath comprising:
a main body structured to define a channel for accommodating at least one conducting cable extending there through, wherein the main body is made of an electrically conducting material, and wherein the main body includes a slit extending along at least a portion of the channel defined by the main body in a direction of a longitudinal axis of the channel, and
a first hook and loop arrangement structured to detachably fasten the cover sheath to a carrier component which includes a further hook and loop arrangement structured to engage with the first hook and loop arrangement, the first hook and loop arrangement being disposed on at least a portion of an outer surface of the main body, and
a slit closing device structured to close the slit after the at least one conducting cable is arranged in the channel defined by the main body,
wherein the main body, when defining the channel with the slit closed by the slit closing device, has an outer appearance corresponding to a shape of the cover sheath.

2. The cover sheath according to claim 1,
wherein the first hook and loop arrangement is made of an electrically insulating material.

3. The cover sheath according to claim 1,
wherein the first hook and loop arrangement is made of an electrically conducting material.

4. The cover sheath according to claim 1,
wherein the main body is made of a finely woven web or mesh.

5. The cover sheath according to of claim 1,
wherein the first hook and loop arrangement is disposed on at least a portion of an outer surface of the main body which extends along at least a portion of the channel defined by the main body in a direction of a longitudinal axis of the channel.

6. The cover sheath according to of claim 1,
wherein the first hook and loop arrangement comprises a substrate, wherein a first surface of the substrate is fastened to the outer surface of the main body, and wherein at least one of hooks and loops extend from a second surface of the substrate.

7. The cover sheath according to claim 1,
wherein at least one of hooks and loops of the first hook and loop arrangement are formed integral with the main body.

8. Use of a cover sheath according to claim 1, in an aircraft.

9. A fastening arrangement comprising:
(a) a cover sheath comprising:
a main body structured to define a channel for accommodating at least one conducting cable extending there through, wherein the main body is made of an electrically conducting material, and wherein the main body includes a slit extending along at least a portion of the channel defined by the main body in a direction of a longitudinal axis of the channel, and
a first hook and loop arrangement structured to detachably fasten the cover sheath to a carrier component, the first hook and loop arrangement being disposed on at least a portion of an outer surface of the main body, and
a slit closing device structured to close the slit after the at least one conducting cable is arranged in the channel defined by the main body,
wherein the main body, when defining the channel with the slit closed by the slit closing device, has an outer appearance corresponding to a shape of the cover sheath, and
(b) a further hook and loop arrangement, the further hook and loop arrangement being structured to be fastened to a carrier component and being structured to interact with the first hook and loop arrangement of the cover sheath so as to detachably fasten the cover sheath to the carrier component.

10. The fastening arrangement according to claim 9,
wherein the first hook and loop arrangement and the further hook and loop arrangement are made of the same material.

11. The fastening arrangement according to claim 9,
wherein the first hook and loop arrangement and the further hook and loop arrangement are shaped and dimensioned so as to be at least substantially congruent.

12. Use of a fastening arrangement according to claim 9, in an aircraft.

13. A method of fastening at least one conducting cable to a carrier component, the method comprising the steps of:
arranging the at least one conducting cable in a channel defined by a main body of a cover sheath according to claim 1,
detachably fastening the cover sheath, together with the at least one conducting cable extending through a channel defined by a main body of the cover sheath, to the carrier component by engaging the first hook and loop arrangement of the cover sheath with the further hook and loop arrangement fastened to the carrier component.

14. The method according to claim 13,
wherein the slit provided in the main body of the cover sheath is closed after arranging the at least one conducting cable in the channel defined by the main body and prior to fastening the cover sheath, together with the at least one conducting cable extending through the channel defined by the main body of the cover sheath, to the carrier component.

15. Use of a method according to claim 13, in an aircraft.

* * * * *